United States Patent
Denley (12)

(10) Patent No.: US 6,447,154 B1
(45) Date of Patent: Sep. 10, 2002

(54) HEADLAMP ADJUSTER WITH OVERLOAD CLUTCH MECHANISM

(75) Inventor: Ronald S. Denley, Woodstock, IL (US)

(73) Assignee: Elco Textron Inc., Rockford, IL (US)

( * ) Notice: Subject to any disclaimer, the term of this patent is extended or adjusted under 35 U.S.C. 154(b) by 0 days.

(21) Appl. No.: 09/690,486

(22) Filed: Oct. 17, 2000

Related U.S. Application Data (60) Provisional application No. 60/168,865, filed on Dec. 3, 1999.

(51) Int. Cl.[7] .............................. F21V 14/02; F21V 7/00
(52) U.S. Cl. .................. 362/515; 362/512; 362/528; 362/529; 362/282; 362/322; 362/531
(58) Field of Search ................................ 362/515, 512, 362/528, 524, 282, 284, 322, 324, 530, 531, 532

(56) References Cited

U.S. PATENT DOCUMENTS

| | | | | |
|---|---|---|---|---|
| 4,574,334 A | * | 3/1986 | Igura | 362/66 |
| 5,309,780 A | * | 5/1994 | Schmitt | 74/89.13 |
| 5,355,287 A | * | 10/1994 | Denley | 362/66 |
| 5,365,415 A | * | 11/1994 | Schmitt et al. | 362/66 |
| 5,539,625 A | * | 7/1996 | Turley, Jr. et al. | 362/66 |

* cited by examiner

*Primary Examiner*—Thomas M. Sember
*Assistant Examiner*—Jacob Y. Choi
(74) *Attorney, Agent, or Firm*—Trexler, Bushnell, Giangiorgi, Blackstone & Marr, Ltd.

(57) ABSTRACT

A headlamp adjuster which includes an adjuster output shaft which is engageable with a reflector of a headlamp assembly. The adjuster output shaft extends from a housing, and the headlamp adjuster is configured such that in an overload condition, the adjuster output shaft is prevented from translating substantially axially, thereby reducing the risk of damage resulting from over-travel of the adjustor output shaft.

13 Claims, 5 Drawing Sheets

HEADLAMP ADJUSTER WITH OVERLOAD CLUTCH MECHANISM

RELATED APPLICATION this application claims the benefit of U.S. Provisional Application Ser. No. 60/168,865, filed Dec. 3, 1999.

BACKGROUND

The present invention relates generally to headlamp adjusters which are used to adjust the position of a reflector of an automobile headlamp assembly, and relates more specifically to a headlamp adjuster which includes an overload clutch mechanism.

Modern day headlamps for vehicles are engineered and designed to be aerodynamically efficient. In this regard, the headlamps are designed as sealed assemblies wherein the portion of the headlamp approximate the outer surface of the automobile is relatively stationary, and is aerodynamic.

Figure 1:
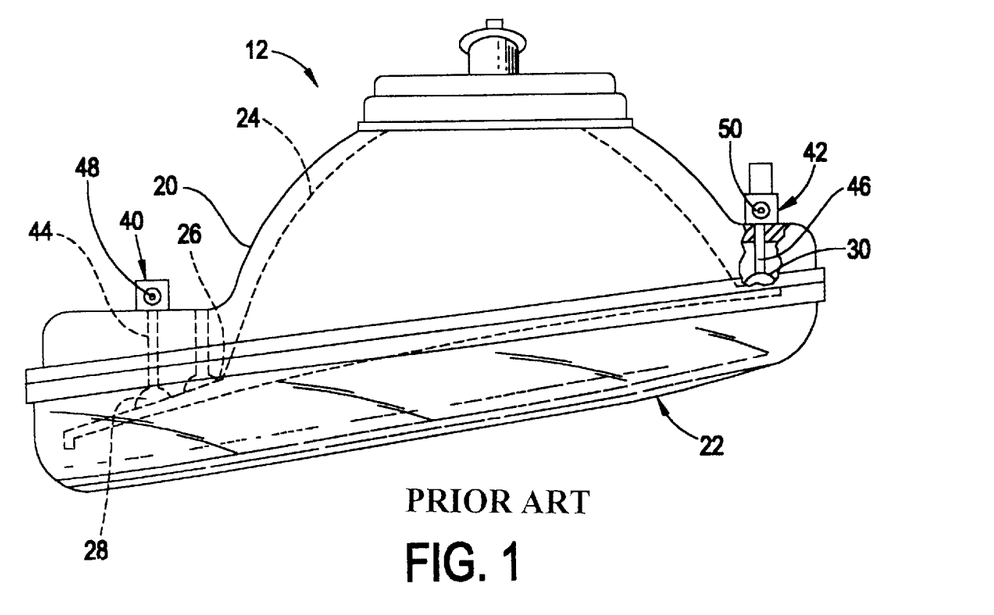
FIG. 1 is a plan view of a typical headlamp assembly.

A typical modern day headlamp assembly 12 is illustrated in a plan view seen as FIG. 1, and normally includes: a fixed housing 20, to which an outer headlamp lens 22 is affixed; a movable reflector 24, which is mounted within the fixed housing 20; and a stationary headlamp bulb (not shown), which is positioned within the movable reflector 24. Typically, the movable reflector 24 is mounted to the housing 20 by a universal or ball-type pivot 26 which is stationary, or fixed, on the housing 20.

A first pivot point 28 is disposed generally vertical of the fixed pivot 6, and a second pivot point 30 is disposed generally horizontal of the fixed pivot 26. As such, the movable reflector 24 may be pivoted about the fixed pivot 26 in the vertical and horizontal planes to aim the headlamp beam. Adjustment mechanisms, or headlamp adjusters, 40 and 42 are typically provided at the first and second pivot points, 28 and 30, normally termed the vertical pivot and the horizontal pivot, and the headlamp adjusters 40 and 42 can be operated to effect movement of the reflector 24 in the vertical and horizontal planes.

The headlamp adjusters 40 and 42 are typically mounted to the housing 20 of the headlamp assembly 12 and have adjuster output shafts 44, 46 operatively connected to the movable reflector 24 by ball and socket type pivots, or the like, such that linear movement of the adjuster output shafts 44, 46 produces pivoting of the movable reflector in the vertical and horizontal planes. Specifically, each headlamp adjuster 40, 42 typically includes drive structure 48, 50 for receiving a tool, and typically the drive structure 48, 50 is precision geared to the adjuster output shaft 44, 46. The gearing provides that using the tool to rotate the drive structure 48, 50 causes linear translation of the adjuster output shaft 44, 46 and therefore adjustment of the position of the headlamp reflector 24.

Before an automobile is released to the consumer, the movable reflectors of the headlamp assemblies are adjusted to a desired position so that the headlamp beams are properly aimed in both the vertical and horizontal directions. To this end, headlamp adjusters are normally operated at the automobile assembly plant. Thereafter, if a movable reflector moves from its desired position, due, for example, to vibration, jarring, or the vehicle being in an accident, a mechanic can operate the headlamp adjusters in order to properly re-align the reflectors.

Typically, headlamp adjusters are structured such that over-travel of the adjuster shafts (i.e. 44 in FIG. 1) is not prevented. Over-travel of the adjuster shaft can cause breakage of the headlamp adjuster housing and/or the reflector to which the adjuster shaft is connected. Specifically, over-extension of the adjuster screw from the housing can damage the reflector, and over-retraction of the adjuster screw into the housing can cause the end of the adjuster screw to contact an interior wall of the housing and result in damage to the housing, such as cracking. A crack in the housing can permit moisture, dirt, etc. to enter the housing which is undesirable.

OBJECTS AND SUMMARY

Accordingly, it is an object of an embodiment of the present invention to provide a headlamp adjuster which is structured such that over-travel of the adjuster output shaft is generally prevented.

Another object of an embodiment of the present invention is to provide a headlamp adjuster which includes an overload clutch mechanism which generally prevents over-travel of the adjuster output shaft.

Briefly, and in accordance with one or more of the foregoing objects, the present invention provides a headlamp adjuster which includes an adjuster output shaft which is engageable with a reflector of a headlamp assembly. The adjuster output shaft extends from a housing, and the headlamp adjuster is configured such that in an overload condition, the adjuster output shaft is prevented from translating substantially axially, thereby reducing the risk of damage resulting from over-travel of the adjustor output shaft.

Although a few embodiments and alternatives are discussed herein, it should be understood that modifications may be made thereto while staying within the scope of the present invention.

BRIEF DESCRIPTION OF THE DRAWINGS

The organization and manner of the structure and function of the invention, together with further objects and advantages thereof, may be understood by reference to the following description taken in connection with the accompanying drawings, wherein.

DESCRIPTION OF EMBODIMENTS

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 2:
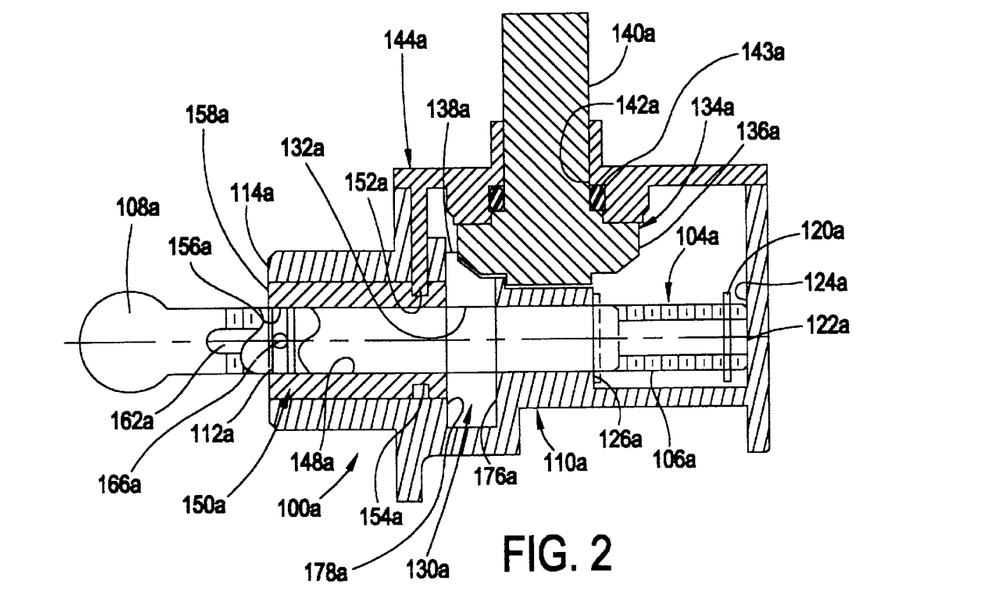
FIG. 2 is a side view, in partial cross-section, of a headlamp adjuster which is in accordance with an embodiment of the present invention.
Figure 3:
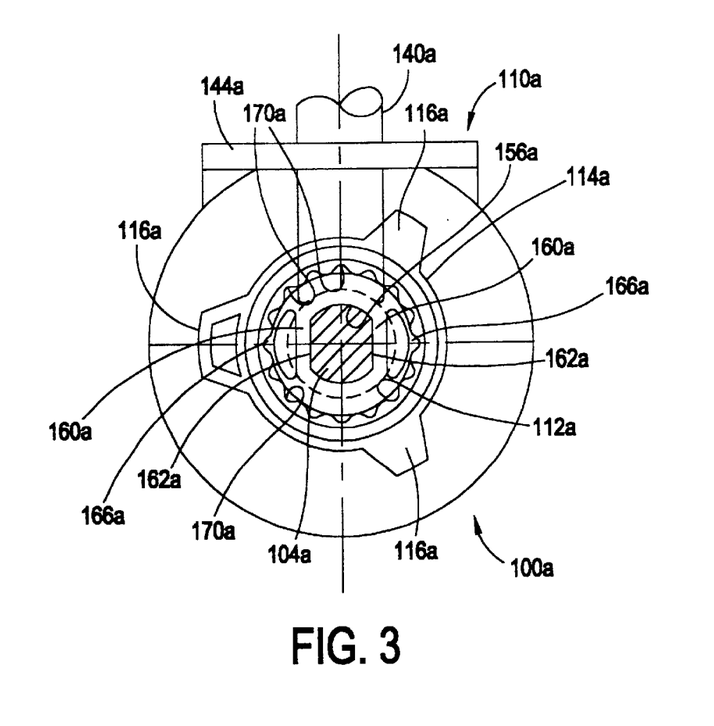
FIG. 3 is a front, elevational view of the headlamp adjuster shown in FIG. 2.
Figure 4:
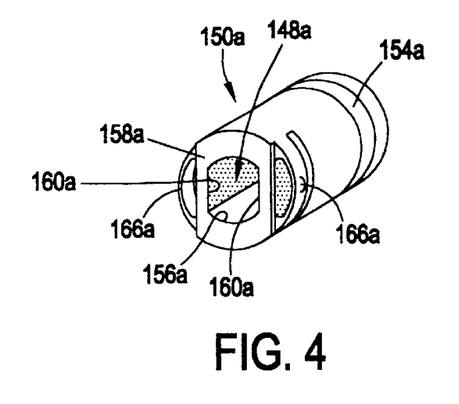
FIG. 4 is a perspective view of a bushing of the headlamp adjuster shown in FIGS. 2 and 3.
Figure 5:
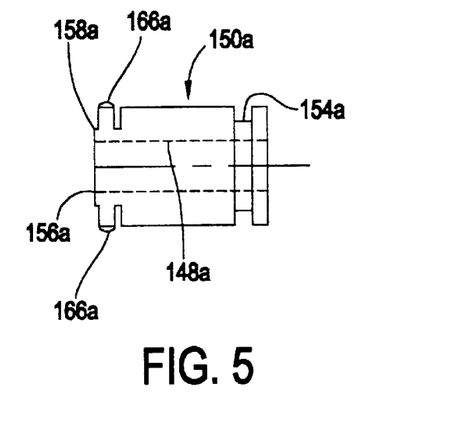
FIG. 5 is a top, plan view of the bushing shown in FIG. 4.
Figure 6:
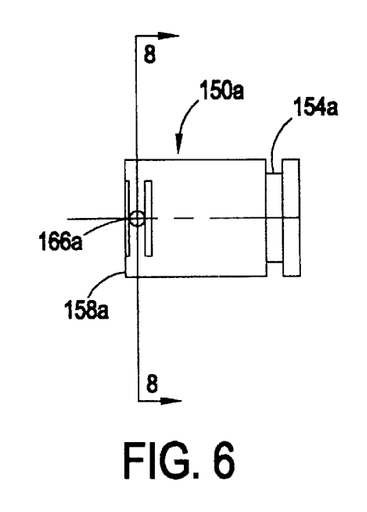
FIG. 6 is a side, elevational view of the bushing shown in FIG. 4.
Figure 7:
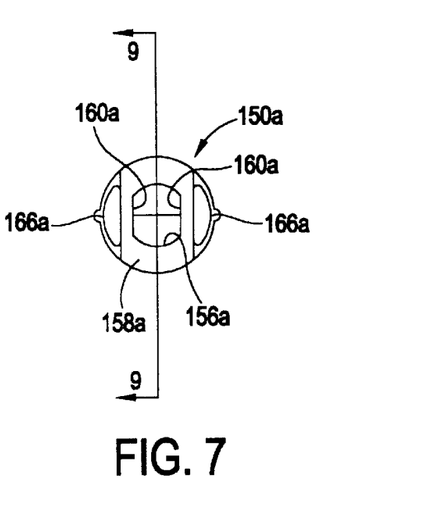
FIG. 7 is a front, elevational view of the bushing shown in FIGS. 4–6.
Figure 10:
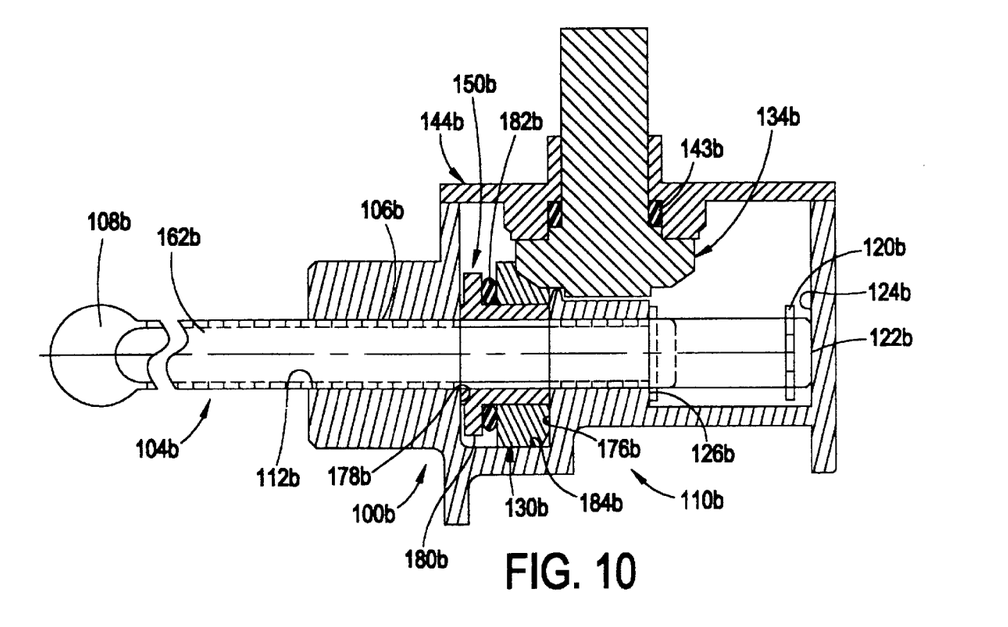
FIG. 10 is a side view, in partial cross-section, of a headlamp adjuster which is in accordance with another embodiment of the present invention.
Figure 11:
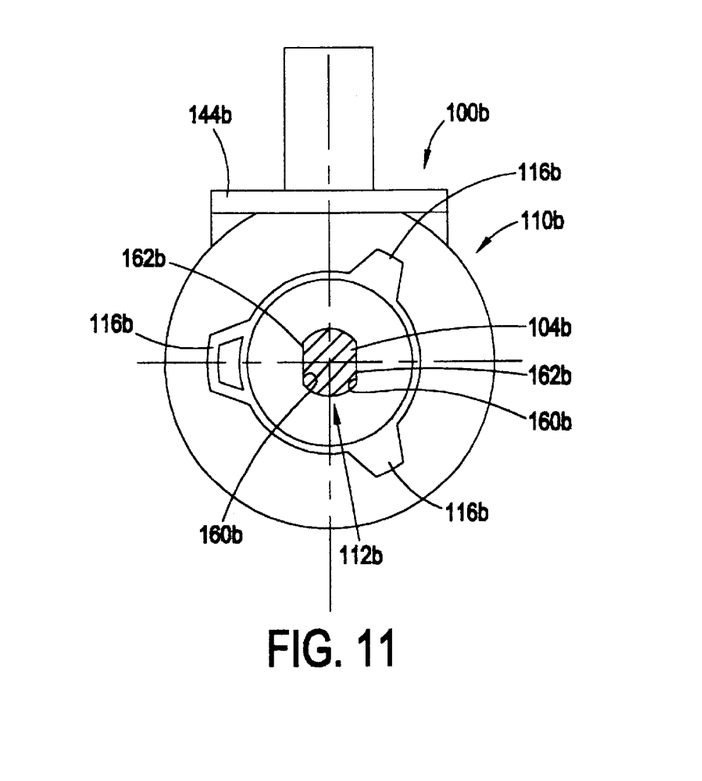
FIG. 11 is a front, elevational view of the headlamp adjuster shown in FIG. 10.
Figure 12:
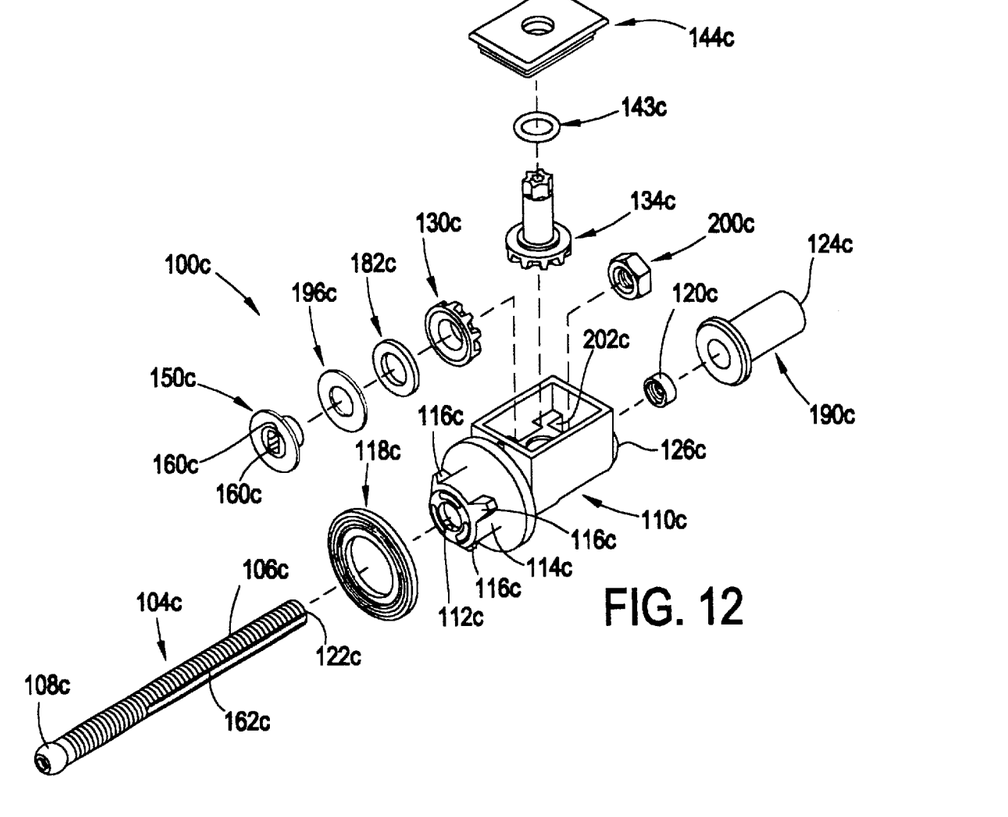
FIG. 12 is an exploded perspective view of a headlamp adjuster which is in accordance with still yet another embodiment of the present invention.

Shown in the FIGURES are several different headlamp adjusters which are in accordance with the present invention. Specifically, FIGS. 2 and 3 illustrate a headlamp adjuster 100a which is in accordance with a first embodiment of the present invention, FIG. 10 and 11 illustrate a headlamp adjuster 100b which is in accordance with a second embodiment of the present invention, and FIG. 12 illustrates a headlamp adjuster 100c which is in accordance with a third embodiment of the present invention. Each headlamp adjuster 100a, 100b, 100c is configured for engagement with the reflector of a headlamp assembly (see FIG. 1). As will be described, each headlamp adjuster 100a, 100b, 100c includes an overload clutch mechanism which generally prevents over-travel of an adjuster output shaft 104a, 104b, 104c.

The headlamp adjuster 100a which is shown in FIGS. 2 and 3 will be described first, and then the other two headlamp adjusters 100b and 100c will be described. In the following description, like reference numerals are used to identify like parts, and different alphabetic suffixes (i.e., "a", "b" and "c") are used for each of the different embodiments. At times, a detailed description of a part is omitted with the understanding that one may review the description relating to like parts of the other embodiments.

The headlamp adjuster 100a shown in FIGS. 2 and 3 includes an adjuster output shaft 104a which is configured for engagement with a reflector 24 of a headlamp assembly 12 (see FIG. 1). Specifically, the adjuster output shaft 104a provides a threaded shaft portion 106a and a ball portion 108a at one end for engagement in a corresponding socket in a reflector 24 (see FIG. 1, and above description, for example; see also FIG. 12 which shows an adjuster output shaft 104c which is identical to adjuster output shaft 104a).

The headlamp adjuster 100a also includes a housing 110a, and the adjuster output shaft 104a extends from a shaft hole 112a in a bushing 150a which is disposed in the housing 110a. The housing 110a is preferably mountable to the headlamp assembly or to some other structure (see FIG. 1), such as a frame-like structure, which is generally proximate the headlamp assembly. Preferably, the headlamp adjuster 100a is "twist lock" mounted, such that the headlamp adjuster 100a is mountable to a headlamp assembly 12 by inserting an end 114a of the housing 110a into an aperture in a housing 20 of the headlamp assembly 12 (see FIG. 1), and rotating the housing 110a of the headlamp adjuster 100a relative to the headlamp assembly 12 through a 120° (one third) rotation. To this end, the housing 110a preferably includes tabs 116a (shown in FIG. 2, but omitted from FIG. 1) for engaging corresponding structure in the aperture in the housing 20 of the headlamp assembly 12.

Preferably, a sealing member (not shown in connection with the headlamp adjuster 100a, but shown as part 118c in connection with headlamp adjuster 100c illustrated in FIG. 12), such as an elastomeric sealing ring formed of R7744 Silicone, is disposed generally proximate the end 114a of the housing 110a. Preferably, when the headlamp adjuster 100a is installed in the aperture in the housing 20 of the headlamp assembly 12, the sealing member engages the housing 20 of the headlamp assembly 12 to provide an axial force between the housing 20 of the headlamp assembly 12 and the housing 110a of the headlamp adjuster 100a and generally reduces the amount of moisture which enters the headlamp assembly 12 through the aperture in the housing 20 of the headlamp assembly 12 and provides axial detent force for rotary lock. As will be described more fully later herein, once the headlamp adjuster 100a is properly mounted and engaged with the reflector 24, the headlamp adjuster 100a can be manipulated to cause the adjuster output shaft 104a to translate relative to the housing 110a and effect an adjustment to the position of the reflector 24.

The housing 110a may be formed of, for example, Zytel 70G13HS1L, and the adjuster output shaft 104a may be formed of, for example, Delrin 570 or Zamac-3 (die casting) with a finish of Zinc/yellow dichromate. Regardless, preferably the adjuster output shaft 104a is easy to mold with plastic or die cast, and is relatively low cost.

As shown in FIG. 2, preferably the adjuster output shaft 104a has a retaining member 120a, such as a retaining ring, thereon. Preferably, the retaining member 120a is "snapped" onto the adjuster output shaft 104a. While the end 122a of the adjuster output shaft 104a opposite the ball portion 108a limits retraction of the adjuster output shaft 104a into the housing 110a by nature of contact between the end 122a of the adjuster output shaft 104a and a rear internal stop wall 124a in the housing 110a, the retaining member 120a disposed on the adjuster output shaft 104a limits extension of the adjuster output shaft 104a from the housing 110a by nature of contact between the retaining member 120a and a forward internal stop wall 126a in the housing 110a (this position is shown in phantom in FIG. 2).

An output gear 130a is seated in the housing 110a, and the output gear 130a generally coaxially receives the adjuster output shaft 104a through a central bore 132a in the output gear 130a. Preferably, the central bore 132a of the output gear 130a is tapped such that it threadably engages the threaded portion 106a of the adjuster output shaft 104a. As a result, rotation of the output gear 130a in the housing 110a causes the adjuster output shaft 104a to translate generally axially in the housing 100a when rotation is prevented by the flats 162a, as seen in FIG. 3, or as will be described more fully later herein, causes the adjuster output shaft 104a to rotate relative to the housing 100a.

An input gear 134a is driveably engaged with the output gear 130a such that rotation of the input gear 134a causes the output gear 130a to rotate. Specifically, preferably external surfaces 136a and 138a of the input gear 134a and output gear 130a, respectively, provide gear teeth with engage each other. Preferably, a drive shaft portion 140a of the input gear 134a extends from an aperture 142a in a cover 144a of the housing 110a, and is configured to be engaged by a tool (not shown) to effect rotation of the input gear 134a, and therefore rotation of the output gear 130a in the housing 110a. As shown, an o-ring may be provided between the cover 144a and the input gear 134 to provide a seal therebetween.

Preferably the adjuster output shaft 104a not only extends through the central bore 132a in the output gear 130a, but also extends through a central bore 148a in a bushing 150a which is also disposed in the housing 110a. A flange or tab 152a on the cover 144a engages a recess 154a on the exterior surface of the bushing 150a. This engagement generally prevents the bushing 150a from moving generally axially within the housing 110a while allowing the bushing 150a to rotate within the housing.

Figure 8:
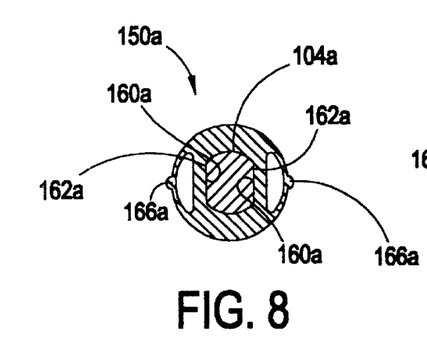
FIG. 8 is a cross-sectional view of the bushing shown in FIGS. 4–7, taken along line 8—8 of FIG. 6.
Figure 9:
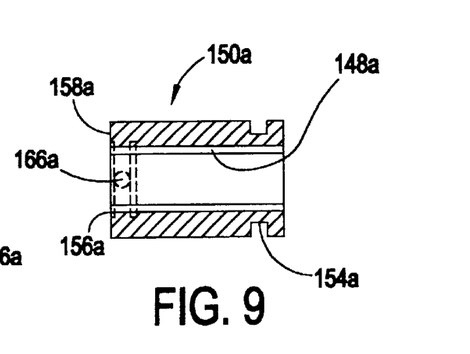
FIG. 9 is a cross-sectional view of the bushing shown in FIGS. 4–8, taken along line 9—9 of FIG. 7.

As shown in FIGS. 3 and 8, preferably the adjuster output shaft 104a extends from an opening 156a in the end 158a of the bushing 150a, and the opening 156a in the end 158a of the bushing 150a is shaped such that it generally corresponds to the cross-sectional area of the adjuster output shaft 104a. Specifically, preferably the opening 156a in the end 158a of the bushing 150a is shaped such that it provides opposing walls 160a which are configured to engage flat surfaces 162a (i.e., "bi-flats") on the adjuster output shaft 104a. The engagement between the opposing walls 160a and the flat surfaces 162a of the adjuster output shaft 104a provides that the adjuster output shaft 104a is generally prevented from rotating relative to the bushing 150a. Therefore, for the adjuster output shaft 104a to rotate relative to the housing 110a, the bushing 150a must also be allowed to rotate relative to the housing 110a.

Preferably, the bushing 150a is formed of plastic or some other relatively flexible material. As shown in FIGS. 2–9, the bushing 150a includes two diametrically-opposed flexible detents 166a which are preferably molded as part of the bushing 150a. As shown in FIGS. 2 and 3, the bushing 150a is journalled within the housing 110a, and the housing 110a contains a plurality of static detents 170a (see FIG. 3) which are formed around the shaft hole 112a in the end 114a of the housing 110a. The flexible detents 166a on the bushing 150a are engageable with and disengageable from the static detents 170a on the housing 110a. When the flexible detents 166a of the bushing 150a are engaged with the static detents 170a of the housing 110a, the bushing 150a is prevented from rotating relative to the housing 110a. In contrast, when the flexible detents 166a of the bushing are disengaged from the static detents 170a of the housing 110a, the bushing 150a can rotate relative to the housing 110a. Therefore, because of the engagement between the walls 160a at the opening 156a in the end 158a of the bushing 150a and the flat surfaces 162a on the adjuster output shaft 104a, the adjuster output shaft 104a cannot rotate in the housing 110a so long as the flexible detents 166a of the bushing 150a are engaged with the static detents 170a of the housing 110a. In contrast, the adjuster output shaft 104a can rotate, along with the bushing 150a, in the housing 110a when the flexible detents 166a of the bushing 110a are disengaged from the static detents 170a of the housing 110a.

In operation, the input gear 134a of the headlamp adjuster 100a is rotated (such as by using a tool on the drive shaft portion 140a) to change the position of the reflector. As the input gear 134a is rotated, the output gear 130a rotates and causes the adjuster output shaft 104a to translate axially in the housing 110a, thereby changing the position of the reflector. So long as the end 122a of the adjuster output shaft 104a does not move into engagement with the rear stop wall 124a in the housing 110a, and the retaining member 120a disposed on the adjuster output shaft 104a does not move into engagement with the forward stop wall 126a in the housing 100a, the flexible detents 166a of the bushing 150a remain engaged with the static detents 170a on the housing 110a, and the bushing 150a and adjuster output shaft 104a are prevented from rotating relative to the housing 110a. Hence, so long as the end 122a of the adjuster output shaft 104a does not move into engagement with the rear stop wall 124a in the housing 110a, and the retaining member 120a disposed on the adjuster output shaft 104a does not move into engagement with the forward stop wall 126a in the housing 110a, rotation of the input gear 134a causes the adjuster output shaft 104a to translate axially in the housing 110a, as opposed to rotate in the housing 110a.

Once the input gear 134a has been rotated enough such that either the end 122a of the adjuster output shaft 104a moves into engagement with the rear stop wall 124a in the housing 110a or the retaining member 120a disposed on the adjuster output shaft 104a moves into engagement with the forward stop wall 126a in the housing 110a, the flexible detents 166a on the bushing 150a disengage from the static detents 170a on the housing 110a and continued rotation of the input gear 134a in the same direction causes the adjuster output shaft 104a (and bushing 150a) to rotate in the housing 110a, as opposed to continue to translate axially, further moving the reflector. Hence, over-travel of the adjuster output shaft 104a in either direction is prevented by a clutch mechanism which is provided by the detents 166a on the bushing 150a and the static detents 170a of the housing 110a.

Preferably, the range of axial travel of the adjuster output shaft 104a is limited to six rotations of the input gear 134a, and during this range of travel, the adjuster output shaft 104a travels about 12 mm. When the input gear 134a is rotated and the retaining member 120a on the adjuster output shaft 104a moves into engagement with the forward stop wall 126a in the housing 110a, the tension in the adjuster output shaft 104a increases due to the output gear 130a being constrained in the housing, bearing on surface 176a. This axial tension effectively couples the output gear 130a to the adjuster output shaft 104a by means of friction at the thread interfaces between the output gear 130a and the adjuster output shaft 104a. When this occurs, the adjuster output shaft 104a tends to rotate the bushing 150a, thereby causing the flexible detents 166a of the bushing 150a to disengage from the static detents 170a on the housing 110a. Thereafter, as the input gear 134a continues to be rotated in the same direction, the bushing 150a is free to rotate in the housing 110a, and the adjuster output shaft 104a, instead of continuing to translate, rotates along with the bushing 150a. Therefore, the adjuster output shaft 104a does not over-travel in the extending direction (i.e., toward the reflector) as the input gear 134a continues to be rotated in the same direction.

Turning the input gear 134a in the opposite direction releases the axial tension between the adjuster output shaft 104a and the output gear 130a. Hence, the friction coupling reduces and the torque on the bushing 150a reduces. When this occurs, the flexible detents 166a on the bushing 150a re-engage the static detents 170a on the housing 110a and the bushing 150a is prevented from continuing to rotate relative to the housing 110a. When the bushing 150a stops rotating, the adjuster output shaft 104a also stops rotating, and instead begins to translate axially away from the stop interference.

As the input gear 134a continues to be rotated in the same direction such that the adjuster output shaft 104a sufficiently axially translates causing the end 122a of the adjuster output shaft 104a to move into contact with the rear stop wall 124a in the housing 110a, the tension in the adjuster output shaft 104a increases due to the output gear 130a being constrained in the housing 110a, bearing on surface 178a. This axial tension effectively couples the output gear 130a to the adjuster output shaft 104a by means of friction at the thread interfaces between the output gear 130a and the adjuster output shaft 104a. When this occurs, the adjuster output shaft 104a tends to rotate the bushing 150a, thereby causing the flexible detents 166a of the bushing 150a to disengage from the static detents 170a on the housing 110a. Thereafter, as the input gear 134a continues to be rotated in the same direction, the bushing 150a is free to rotate in the housing 110a, and the adjuster output shaft 104a, instead of continuing to translate, rotates along with the bushing 150a. Therefore, the adjuster output shaft 104a does not over-travel in the retracting direction (i.e., away from the reflector) as the input gear 134a continues to be rotated in the same direction.

Turning the input gear 134a in the opposite direction releases the axial tension between the adjuster output shaft 104a and the output gear 130a. Hence, the friction coupling reduces and the torque on the bushing 150a reduces. When this occurs, the flexible detents 166a on the bushing 150a re-engage the static detents 170a on the housing 110a and the bushing 150a is prevented from continuing to rotate relative to the housing 110a. When the bushing 150a stops rotating, the adjuster output shaft 104a also stops rotating, and instead begins to translate axially away from the stop interference.

Hence, over-travel of the adjuster output shaft 104a in either direction is prevented by a clutch mechanism which is provided by the detents 166a on the bushing 150a and the static detents 170a of the housing 110a. The detent force is important to the clutch mechanism function. One having ordinary skill in the art would recognize that a higher initial coupling (frictional) between the adjuster output shaft 104a and the output gear 130a would allow for more margin to meet clutch slip torque which is determined by the detenting.

The headlamp adjuster 100b shown in FIGS. 10 and 11 is similar to the headlamp adjuster 100a shown in FIGS. 2 and 3. Therefore, similar reference numerals are used to identify similar parts, and the alphabetic suffix "b" is used. At times, a detailed description of a part is omitted with the understanding that one may review the description relating to a corresponding part of one of the other embodiments.

The headlamp adjuster 100b shown in FIGS. 10 and 11 includes an adjuster output shaft 104b having a ball portion 108b, a threaded portion 106b, and flat surface portions 162b (i.e., "bi-flats"), and the adjuster output shaft 104b has a retaining member 120b thereon. The headlamp adjuster 100b, like headlamp adjuster 100a, includes a housing 110b, a cover 144b and a sealing member 143b. As shown in FIG. 11 (but omitted from FIG. 10), like the housing of headlamp adjuster 100a, preferably the housing 110b of headlamp adjuster 100b has tabs 116b thereon which engage corresponding structure in the aperture in the housing 20 of the headlamp assembly 12 (see FIG. 1), thereby providing that the headlamp adjuster 100b is "twist lock" mountable. The housing 100b includes a shaft hole 112b from which the adjuster output shaft 104b extends. As shown in FIG. 11, the shaft hole 112b is shaped such that it generally corresponds to the cross-sectional area of the adjuster output shaft 104b. Specifically, preferably the shaft hole 112b provides opposing walls 160b which are configured to engage the flat surfaces 162b (i.e., the "bi-flats") on the adjuster output shaft 104b. The engagement between the opposing walls 160b and the flat surfaces 162b of the adjuster output shaft 104b provides that the adjuster output shaft 104b is generally prevented from rotating relative to the housing 110b.

As shown in FIG. 10, the headlamp adjuster 100b, like headlamp adjuster 100a, includes an input gear 134b and an output gear 130b. However, unlike headlamp adjuster 100a, the output gear 130b of headlamp adjuster 100b is not threadably engaged with the adjuster output shaft 104b. Instead, a clutch bushing 150b is threadably engaged with the adjuster output shaft 104b, and the output gear 130b has a free running fit on the external surface of the clutch bushing 150b. The clutch bushing 150b includes a shoulder 180b, and a friction coupling member 182b, such as an o-ring formed of nitrile, which is compressed between the output gear 130b and the shoulder 180b of the clutch bushing 150b. In addition to providing a friction coupling, the elastomeric nature of the o-ring also provides a biasing action. As shown in FIG. 10, the clutch bushing 150b, elastomeric member 182b, and output gear 130b are disposed in a seat 184b in the housing 110b. The compressed elastomeric member 182b provides a friction coupling between the threaded clutch bushing 150b and the output gear 130b, which can slip under an overload condition.

In operation, the input gear 134b of the headlamp adjuster 100b is rotated (such as by using a tool) to change the position of the reflector. As the input gear 134b is rotated, the output gear 130b rotates and, because of the friction coupling between the output gear 130b and clutch bushing 150b, provided by the compressed friction coupling member 182b, the clutch bushing 150b also rotates. Rotation of the clutch bushing 150b causes the adjuster output shaft 104b to translate due to the threadable engagement between the output gear 130b and adjuster output shaft 104b and the engagement of the adjuster output shaft 104b with the opposing walls 160b at the shaft hole 112b in the housing 110b (see FIG. 11). As the adjuster output shaft 104b translates axially, the position of the reflector changes. So long as the end 112b of the adjuster output shaft 104b does not move into engagement with a rear stop wall 124b in the housing 110b, and the retaining member 120b disposed on the adjuster output shaft 104b does not move into engagement with a forward stop wall 126b in the housing 110b, rotation of the input gear 134b causes the clutch bushing 150b to rotate and the adjuster output shaft 104b to translate axially.

Once the input gear 134b has been rotated enough such that either the end 122b of the adjuster output shaft 104b moves into engagement with the rear stop wall 124b in the housing 110b or the retaining member 120b disposed on the adjuster output shaft 104b moves into engagement with the forward stop wall 126b in the housing 110b, the output gear 130b will slip relative to the clutch bushing 150b and the clutch bushing 150b will not rotate. That is to say, an overload condition will exist, such that continued attempt to rotate the input gear 134b, will overcome the friction coupling provided by the elastomeric member 182b and output gear 130b will in effect "slip" relative to the clutch bushing 150b. Thus, the input gear 134b and the output gear 130b can rotate without movement of the output shaft 104b. Hence, the adjuster output shaft 104b does not continue to translate axially. The clutch action between the output gear 130b and the clutch bushing 150b when the end 122b of the adjuster output shaft 104b moves into engagement with the rear stop wall 124b in the housing 110b or the retaining member 120b disposed on the adjuster output shaft 104b moves into engagement with the forward stop wall 126b in the housing 110b provides that over-travel of the adjuster output shaft 104b in either direction is prevented.

Preferably, the range of axial travel of the adjuster output shaft 104b is limited to six rotations of the input gear 134b, and during this range of travel, the adjuster output shaft 104b travels about 12 mm. When the input gear 134b is rotated and the retaining member 120b on the adjuster output shaft 104b moves into engagement with the forward stop wall 126b in the housing 110b, the tension in the adjuster output shaft 104b increases due to the output gear 130b being constrained in the housing, bearing on surface 176b. This axial tension effectively couples the clutch bushing 150b to the adjuster output shaft 104b by means of friction at the thread interfaces between the clutch bushing 150b and the adjuster output shaft 104b. When this occurs, further rotation of the input gear 134b causes the output gear 130b to slip relative to the clutch bushing 150b, and the adjuster output shaft 104b no longer translates axially. Therefore, the adjuster output shaft 104b does not over-travel in the extending direction (i.e., toward the reflector) as the input gear 134 continues to be rotated in the same direction.

Turning the input gear 134b in the opposite direction releases the axial tension between the adjuster output shaft 104b and the clutch bushing 150b. Hence, the friction coupling reduces, and the clutch bushing 150b begins to move along with the output gear 130b, and the adjuster output shaft 104b begins to translate axially.

As the input gear 134b continues to be rotated in the same direction such that the adjuster output shaft 104b sufficiently axially translates causing the end 122b of the adjuster output shaft 104b to move into contact with the rear stop wall 124b in the housing 110b, the tension in the adjuster output shaft 104b increases due to the clutch bushing 150b being constrained in the housing 110b, bearing on surface 178b. This axial tension effectively couples the clutch bushing to the adjuster output shaft 104b by means of friction at the thread interfaces between the clutch bushing 150b and the adjuster output shaft 104b. When this occurs, further rotation of the input gear 134b causes the output gear 130b to slip relative to the clutch bushing 150b, and the adjuster output shaft 104b no longer translates axially. Therefore, the adjuster output shaft 104b does not over-travel in the retracting direction (i.e., away from the reflector) as the input gear 134b continues to be rotated in the same direction.

Turning the input gear 134b in the opposite direction releases the axial tension between the adjuster output shaft 104b and the clutch bushing 150b. Hence, the friction coupling reduces, and the clutch bushing 150b begins to move again along with the output gear 130b, and the adjuster output shaft 104b begins to translate axially.

Hence, over-travel of the adjuster output shaft 104b in either direction is prevented by a clutch mechanism which is provided by the interaction between the output gear 130b, the elastomeric member 182b and the clutch bushing 150b.

The headlamp adjuster 100c shown in FIG. 12 is similar to the headlamp adjusters 100a and 100b shown in FIGS. 2–3 and 10–11, respectively. Therefore, similar reference numerals are used to identify similar parts, and the alphabetic suffix "c" is used. At times, a detailed description of a part is omitted with the understanding that one may review the description relating to a corresponding part of one of the other embodiments.

Figures 13, 14, 15:
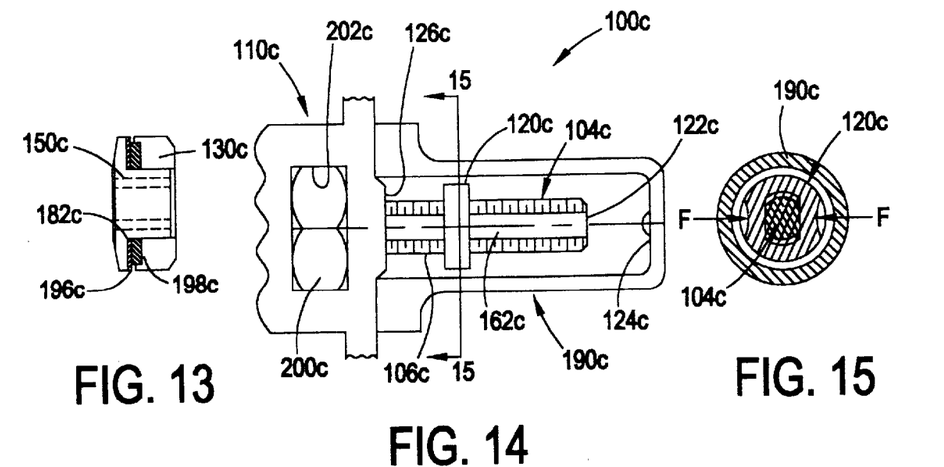
FIG. 13 is a side, elevational view, partially in section, of an output gear, retaining member and clutch bushing configuration which is used in connection with the headlamp adjustor which is shown in FIG. 12.
FIG. 14 is a side, elevational view, partially in section, of a rear portion of the headlamp adjuster shown in FIG. 12.
FIG. 15 is a rear, cross-sectional view of the headlamp adjuster shown in FIG. 12, taken along line 15—15 of FIG. 14.

The headlamp adjuster 100c shown in FIG. 12 includes an adjuster output shaft 104c having a ball portion 108c, a threaded portion 106c, and flat surface portions 162c (i.e., "bi-flats"), and the adjuster output shaft 104c has a retaining member 120c thereon. Preferably, the retaining member 120c is crimped onto the adjuster output shaft 104c (represented with force arrows "F" in FIG. 15) so that the retaining member 120c does not have a tendency to rotate relative to the adjuster output shaft 104c. The headlamp adjuster 100c, like headlamp adjusters 100a and 100b, includes a housing 110c, a cover 144c and a sealing member 143c, and preferably includes a sealing member 118c proximate the front 114c of the housing 110c for sealing against the housing 20 of the headlamp assembly 12 (see FIG. 1). As shown, preferably the housing 110c of headlamp adjuster 100c has tabs 116c thereon which engage corresponding structure in the aperture in the housing 20 of the headlamp assembly 12, thereby providing that the headlamp adjuster 100c is "twist lock" mountable. The housing 110c includes a shaft hole 112c from which the adjuster output shaft 104c extends. As shown in FIGS. 12 and 14, a tower 190c is attached to the rear of the housing 110c, and the end 122c of the adjuster output shaft 104c extends into the tower 190c.

As shown in FIG. 12, the headlamp adjuster 100c, like headlamp adjuster 100b, includes an input gear 134c, an output gear 130c, a clutch bushing 150c and a friction coupling member 182c, such as an elastomeric washer. However, unlike the headlamp adjuster 100b shown in FIGS. 10 and 11, the headlamp adjuster shown in FIG. 12 includes a clutch mechanism which has an additional member in the form of a friction washer 196c which is disposed intermediate the output gear 130c and the clutch bushing 150c. The configuration of the output gear 130c, friction coupling member 182c, friction washer 196c and clutch bushing 150c is shown in FIG. 13. As shown, the output gear 130c provides a seat 198c for receiving the elastomeric friction coupling member 182c, and the friction washer 196c is provided between the elastomeric member 182c and the clutch bushing 150c. Preferably, the output gear 130c has a free running fit on the external surface of the extension on the clutch bushing 150c, and the compressed friction coupling member 182c provides a friction coupling between the clutch bushing 150c and the output gear 130c. The biasing action provided by the elastomeric member 182c, forces the friction washer 196c into engagement with clutch bushing 150c. Preferably, the friction washer 196c is formed of a flexible non-asbestos molded material with medium to high friction, good stability and good wear characteristics.

Specifically, the friction washer 196c may be obtained from Great Lakes Friction Products, Inc. 8601 North 43rd Street, Milwaukee, Wis. 53209 pursuant to Engineering Product Data Sheet GL134-142. The friction washer 196c effectively acts as a barrier to adhesion between the elastomeric member 182c and the clutch bushing 150c. In other words, the friction washer 196c will have a tendency to slip relative to the clutch bushing 150c before the elastomeric member 182c has a tendency to slip between the friction washer 196c and the output gear 130c. As a result, a more constant breakaway torque (between the clutch bushing 150c and output gear 130c) is maintained over time compared to the embodiment wherein the friction washer 196c is not utilized (i.e., as shown in FIG. 10). It should be noted however, that while it is preferred that the clutch action take place between the friction washer 196c and clutch bushing 150c, slippage may also occur between member 182c and the friction washer 196c.

As shown in FIG. 12, a nut 200c is provided in a seat 202c in the housing 110c. Preferably, unlike with headlamp adjuster 100b, the clutch bushing 150c is not threadably engaged with the adjuster output shaft 104c. Instead, the adjuster output shaft 104c is threadably engaged with the nut 200c which is seated in the housing 110c, as shown in FIG. 14, and the clutch bushing 150c provides opposing walls 160c (see FIG. 12) which engage the flat portions 162c of the adjuster output shaft 104c. Hence, the adjuster output shaft 104c cannot rotate relative to the clutch bushing 150c, and rotation of the clutch bushing 150c causes the adjuster output shaft 104c to also rotate, however the shaft 104c is free to translate relative to the bushing 150c. The threadable engagement between the nut 200c which is seated in the housing 100c (see FIG. 14) and the adjuster output shaft 104c causes the adjuster output shaft 104c to translate axially when the adjuster output shaft 104c rotates. Therefore, rotation of the clutch bushing 150c causes the adjuster output shaft 104c to translate axially, thereby changing the position of the reflector which is engaged with the adjuster output shaft 104c (see FIG. 1).

In operation, the input gear 134c of the headlamp adjuster 100c is rotated (such as by using a tool) to change the position of the reflector. As the input gear 134c is rotated, the output gear 130c rotates and, because of the friction coupling between the output gear 130c, elastomeric member 182c, friction washer 196c and clutch bushing 150c, the clutch bushing 150c also rotates. Rotation of the overall clutch mechanism, including bushing 150c causes the adjuster output shaft 104c to translate due to the threadable engagement between the adjuster output shaft 104c and the nut 200c which is seated in the housing 110c (see FIGS. 12 and 14). As the adjuster output shaft 104c translates axially, the position of the reflector changes. So long as the end 122c of the adjuster output shaft 104c does not move into engagement with a rear stop wall 124c in the tower 190c, and the retaining member 120c disposed on the adjuster output shaft 104c (see FIGS. 12 and 14) does not move into engagement with a forward stop wall 126c on the housing 110c, rotation of the input gear 134c causes the clutch bushing 150c to rotate and the adjuster output shaft 104c to translate axially.

Once the input gear 134c has been rotated enough such that either the end 122c of the adjuster output shaft 104c moves into engagement with the rear stop wall 124c in the tower 190c or the retaining member 120c disposed on the adjuster output shaft 104c moves into engagement with the forward stop wall 126c on the housing 110c, the output gear 130c, elastomeric member 182c and friction washer 196c will slip relative to the clutch bushing 150c and the clutch bushing 150c will not rotate. That is to say, an overload condition will exist, such that continued attempt to rotate the input gear 134c, will overcome the friction coupling provided by the elastomeric member 182c and output gear 130c will in effect "slip" relative to the clutch bushing 150c. Thus, the input gear 134c and the output gear 130c can rotate without movement of the output shaft 104c. Hence, the adjuster output shaft 104c does not continue to translate axially. The clutch action between the output gear 130c and the clutch bushing 150c when the end 122c of the adjuster output shaft 104c moves into engagement with the rear stop wall 124c in the tower 190c or the retaining member 120c disposed on the adjuster output shaft 104c moves into engagement with the forward stop wall 126c on the housing 110c provides that over-travel of the adjuster output shaft 104c in either direction is prevented.

Preferably, the range of axial travel of the adjuster output shaft 104c is limited to six rotations of the input gear 134c, and during this range of travel, the adjuster output shaft 104c travels about 12 mm. When the input gear 134c is rotated and the retaining member 120c on the adjuster output shaft 104c moves into engagement with the forward stop wall 126c on the housing 110c, the tension in the adjuster output shaft 104c increases due to the output gear 130c being constrained in the housing 110c. This axial tension effectively couples the clutch bushing 150c to the adjuster output shaft 104c by means of friction at the interface therebetween. When this occurs, further rotation of the input gear 134c causes the output gear 130c, elastomeric member 182c and friction washer 196c to slip relative to the clutch bushing 150c, and the adjuster output shaft 104c no longer translates axially. Therefore, the adjuster output shaft 104c does not over-travel in the extending direction (i.e., toward the reflector) as the input gear 134c continues to be rotated in the same direction.

Turning the input gear 134c in the opposite direction releases the axial tension between the adjuster output shaft 104c and the clutch bushing 150c. Hence, the friction coupling reduces, and the clutch bushing 150c begins to move along with the output gear 130c, and the adjuster output shaft 104c begins to translate axially.

As the input gear 134c continues to be rotated in the same direction such that the adjuster output shaft 104c sufficiently axially translates causing the end 122c of the adjuster output shaft 104c to move into contact with the rear stop wall 124c in the tower 190c, the tension in the adjuster output shaft 104c increases due to the clutch bushing 150c being constrained in the housing 110c. This axial tension effectively couples the clutch bushing 150c to the adjuster output shaft 104c by means of friction at the interface therebetween. When this occurs, further rotation of the input gear 134c causes the output gear 130c, elastomeric member 182c and friction washer 196c to slip relative to the clutch bushing 150c, and the adjuster output shaft 104c no longer translates axially. Therefore, the adjuster output shaft 104c does not over-travel in the retracting direction (i.e., away from the reflector) as the input gear 134c continues to be rotated in the same direction.

Turning the input gear 134c in the opposite direction releases the axial tension between the adjuster output shaft 104c and the clutch bushing 150c. Hence, the friction coupling reduces, and the clutch bushing 150c begins to move again along with the output gear 130c, and the adjuster output shaft 104c begins to translate axially.

Hence, over-travel of the adjuster output shaft 104c in either direction is prevented by a clutch mechanism which is provided by the interaction between the output gear 130c, the elastomeric member 182c, the friction washer 196c and the clutch bushing 150c.

By providing that each headlamp adjuster 100a, 100b, 100c includes a clutch mechanism, each headlamp adjuster 100a, 100b, 100c is configured to generally prevent over-travel of the adjuster output shaft 104a, 104b, 104c in both the extending and retracting directions. Hence, the reflector and the headlamp adjusters 100a, 100b, 100c do not tend to become damaged as a result of over-rotation of the input gear 134a, 134b, 134c.

While embodiments of the present invention are shown and described, it is envisioned that those skilled in the art may devise various modifications without departing from the spirit and scope of the foregoing description.

What is claimed is:

1. A headlamp adjuster for adjusting a position of a reflector of a headlamp assembly, said headlamp adjuster comprising: a housing; an adjuster output shaft which extends from said housing and is engageable with the reflector of the headlamp assembly, said headlamp adjuster configured such that in an overload condition, the adjuster output shaft is prevented from translating substantially axially, further comprising at least one static detent which is in the housing; and a bushing disposed in the housing and having an opening, said adjuster output shaft extending through said opening in said bushing, said bushing providing at least one flexible detent which is engaged with said at least one static detent, wherein said headlamp adjuster is configured such that when said at least one flexible detent is engaged with said at least one static detent, said adjuster output shaft is translatable substantially axially, and wherein said headlamp adjuster is configured such that when said at least one flexible detent disengages from said at least one static detent, said adjuster output shaft is prevented from translating substantially axially.

2. A headlamp adjuster as recited in claim 1, a first stop wall in said housing for limiting the extension of said adjuster output shaft from said housing and a second stop wall for limiting the retraction of said adjuster output shaft into said housing, further comprising a retaining member on said adjuster output shaft, said retaining member contactable with said first stop wall in said housing for limiting the extension of said adjuster output shaft from said housing, said adjuster output shaft having an end, said end contactable with said second stop wall in said housing for limiting the retraction of said adjuster output shaft into said housing.

3. A headlamp adjuster as recited in claim 2, said headlamp adjuster configured such that said adjuster output shaft and said bushing are not generally rotatable in said housing unless said retaining member on said adjuster output shaft is in contact with said first stop wall or said end of said adjuster output shaft is in contact with said second stop wall.

4. A headlamp adjuster as recited in claim 1, said at least one flexible detent and said at least one static detent together comprising an overload clutch mechanism, said overload clutch mechanism configured to generally prevent said adjuster output shaft from being over extended or over retracted.

5. A headlamp adjuster as recited in claim 1, further comprising an output gear engaged with said adjuster output shaft and an input gear engaged with said output gear.

6. A headlamp adjuster as recited in claim 1, a first stop wall in said housing for limiting the extension of said adjuster output shaft from said housing and a second stop wall for limiting the retraction of said adjuster output shaft into said housing.

7. A headlamp adjuster as recited in claim 6, further comprising a retaining member on said adjuster output shaft, said retaining member contactable with said first stop wall in said housing for limiting the extension of said adjuster output shaft from said housing.

8. A headlamp adjuster as recited in claim 1, said housing including a cover, said headlamp adjuster further comprising a bushing disposed generally in said housing and having an opening, said adjuster output shaft extending through said opening in said bushing, said cover engaged with said bushing.

9. A headlamp adjuster for adjusting a position of a reflector of a headlamp assembly, said headlamp adjuster comprising: a housing; an adjuster output shaft which extends from said housing and is engageable with the reflector of the headlamp assembly, said headlamp adjuster configured such that in an overload condition, the adjuster output shaft is prevented from translating substantially axially; a clutch bushing engaged with said adjuster output shaft; an output gear engaged with said clutch bushing; and an input gear engaged with said output gear, said input gear and said output gear being distinct from and not integral with said clutch bushing, said headlamp adjuster configured such that said clutch bushing is slippable relative to said output gear to prevent substantial axial translation of said adjuster output.

10. A headlamp adjuster as recited in claim 9, further comprising a friction coupling member engaged with said clutch bushing and with said output gear.

11. A headlamp adjuster as recited in claim 9, a first stop wall in said housing for limiting the extension of said adjuster output shaft from said housing and a second stop wall for limiting the retraction of said adjuster output shaft into said housing, said headlamp adjuster further comprising a retaining member on said adjuster output shaft, said retaining member contactable with said first stop wall in said housing for limiting the extension of said adjuster output shaft from said housing, said adjuster output shaft having an end, said end contactable with said second stop wall in said housing for limiting the retraction of said adjuster output shaft into said housing.

12. A headlamp adjuster as recited in claim 11, said headlamp adjuster configured such that said clutch bushing is slippable relative to said output gear to prevent substantial axial translation of said adjuster output when said retaining member on said adjuster output shaft is in contact with said first stop wall or said end of said adjuster output shaft is in contact with said second stop wall.

13. A headlamp adjuster for adjusting a position of a reflector of a headlamp assembly, said headlamp adjuster comprising: a housing; an adjuster output shaft which extends from said housing and is engageable with the reflector of the headlamp assembly, said headlamp adjuster configured such that in an overload condition, the adjuster output shaft is prevented from translating substantially axially; a clutch bushing engaged with said adjuster output shaft; an output gear engaged with said clutch bushing; an input gear engaged with said output gear; a friction coupling member engaged with said clutch bushing and with said output gear; and a friction washer which is disposed intermediate said output gear and said clutch bushing, said input gear and said output gear being distinct from and not integral with said clutch bushing, said headlamp adjuster configured such that said friction washer is slippable relative to said clutch bushing to prevent substantial axial translation of said adjuster output.

\* \* \* \* \*